United States Patent
Oppliger

[11] Patent Number: 6,105,466
[45] Date of Patent: Aug. 22, 2000

[54] BAND SAW BLADE TENSIONING MACHINE

[76] Inventor: Walter Oppliger, Industriestrasse 11, CH-3138 Uetendorf, Switzerland

[21] Appl. No.: 08/896,082

[22] Filed: Jul. 17, 1997

[30] Foreign Application Priority Data

Jul. 22, 1996 [EP] European Pat. Off. ............... 96111742

[51] Int. Cl.$^7$ .................................................. B23D 63/18
[52] U.S. Cl. .................................................. 76/27; 76/112
[58] Field of Search ............... 76/25.1, 27, 112; 83/802, 814, 76.1, 76.7, 522.15, 788, 820

[56] References Cited

U.S. PATENT DOCUMENTS

| 3,916,680 | 11/1975 | Allen et al. | 73/100 |
|---|---|---|---|
| 3,919,900 | 11/1975 | Allen et al. | 76/27 |
| 4,237,757 | 12/1980 | Bonac | 83/74 |
| 4,321,849 | 3/1982 | Athey et al. | 83/816 |
| 4,852,430 | 8/1989 | Oppliger et al. | 76/27 |
| 5,237,897 | 8/1993 | Wijesinghe | 83/72 |
| 5,931,057 | 8/1999 | Beck et al. | |

FOREIGN PATENT DOCUMENTS

WO 92/19407 11/1992 WIPO.
WO 96/36453 11/1996 WIPO.

*Primary Examiner*—Kenneth E. Peterson
*Attorney, Agent, or Firm*—Dike, Bronstein, Roberts & Cushman, LLP; George W. Neuner

[57] ABSTRACT

A band saw blade tensioning machine with a tensioning station for rolling tension into the band saw blade and a measuring station disposed above the saw blade for recording the curvature across the band saw blade while this is travelling freely from an elevated point to the measuring site. Rollers are disposed opposite each other with curved surfaces and a device for simultaneously pressing the rollers against the upper and lower side of the band saw blade to roll tension into the blade.

2 Claims, 2 Drawing Sheets

BAND SAW BLADE TENSIONING MACHINE

BACKGROUND OF THE INVENTION

The invention relates to a band saw blade tensioning machine with a measuring station for measuring the tension in the band saw blade, comprising a flat support for the blade, and a tensioning station for rolling tension into the band saw blade.

Band saw blade straightening machines such as those disclosed, for example, in U.S. Pat. No. 4,852,430 yield very good results with considerably reduced handling. Apart from the need that they be as free from unevenness as possible, the second prerequisite for band saw blades is that they have a defined tension contained in the band saw blade. This tension substantially consists in the circumferential length of the band saw blade being largest in the median range between back and teeth and in decreasing outwards in both directions. This tension is needed to ensure that the band saw blade lies optimally on the curved circumferential surfaces of the blade drive wheels.

Another important prerequisite is the straightness of the back and of the front of the teeth. Both the tension and the straightness can be rolled by means of suitable rolling processes along circumferential lines in the band saw blade.

In WO-A-92/19407 a tensioning or truing machine for band saw blades is disclosed. This machine has a tension measuring device which detects the tension in the blades and a processing unit which contains a pair of tensioning rollers moveable across the blade to effect the necessary rolling along the circumferential lines of the blades. The applied pressure of the tensioning rollers is controlled in dependency of the detected tension. The measuring device is positioned at a location, where the saw blade is curved and where, thus, the longitudinal tension results in a curvature across the blade. This curvature is concave at the lower surface of the blade where the measurement is effected. This has certain disadvantages because the measurements has to be made from underneath.

It is therefore an object of the invention to provide a band saw tensioning machine able to roll tension in an automated working sequence into the band saw blade, which avoids the disadvantages of the previously known systems.

BRIEF SUMMARY OF THE INVENTION

According to the invention, this is achieved by means for guiding the blade over a point higher in level as compared to the level of the support, said means being located at a distance before the said measuring station to the effect that the blade travels in a free curve from the said elevated point to the flat support, and thereby allowing the release of the tension of the saw blade into a curved cross-section thereof, a curved template in the measuring station across the saw blade along which template a measuring gauge is moved for touching the saw blade surface with a tracing pin, the curvature of the template being the desired curvature of the tension-released saw blade, the measuring station generating a measuring signal, rollers disposed opposite each other above and below the band saw blade with curved surfaces and means for simultaneously pressing the rollers against the lower and upper side of the band saw blade and a control unit for processing the measuring signal and generating a control signal to the means for pressing against the rollers.

A further improvement of the invention consists in an additional feeler gauge for scanning the back of the saw blade and generating a second measuring signal if the back deviates from straightness.

BRIEF DESCRIPTION OF THE DRAWINGS

There follows a description of an embodiment of the invention with reference to the appended drawings. No mention is made of details which are known from U.S. Pat. No. 4,852,430 or WO-A-92/19407 which have no direct relevance to the present invention. There are shown in FIG. 1 a schematic view of a band saw blade tensioning machine according to the invention, FIG. 2 a diagrammatic perspective representation of the tensioning station of FIG. 1, FIG. 3 a schematic cross-section along line A—A o FIG. 1.

DETAILED DESCRIPTION OF THE INVENTION

Figure 1:
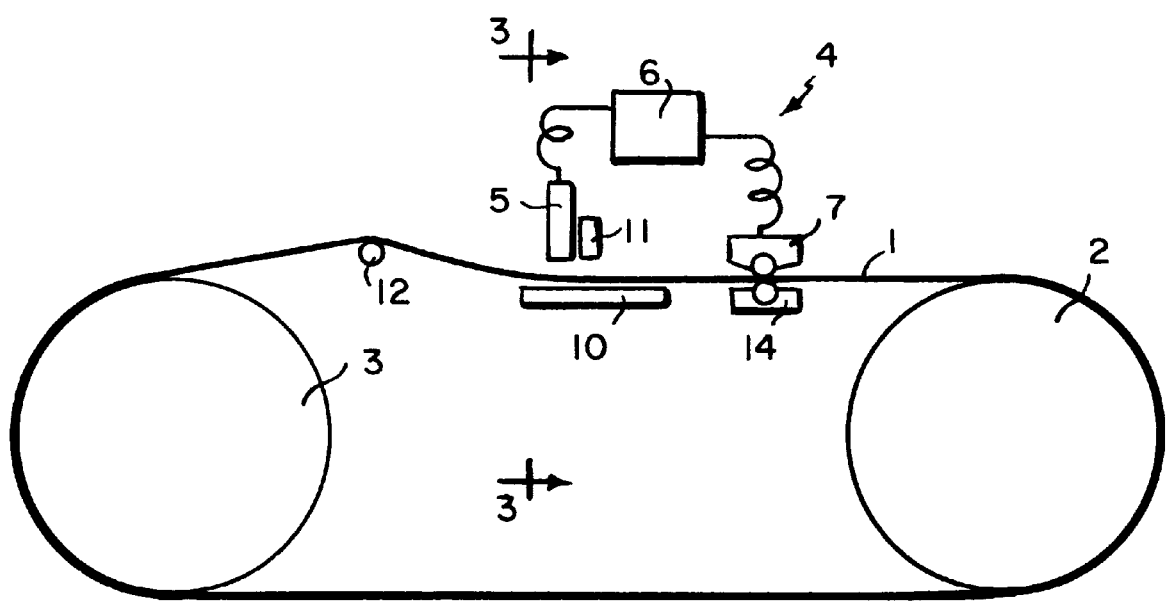

As shown in FIG. 1 a band saw blade 1 is guided by two wheels 2, 3 being part of a band saw blade tensioning machine. The saw blade is travelling in clockwise direction, i.e. the upper part is moving from left to right. This upper part is passing through a tensioning station 4 which is quite similar to the straightening station shown in U.S. Pat. No. 4,852,430. The tensioning station 4 contains a sensing device 5 for detecting the tension in the saw blade. To this end the saw blade is guided via a roll 12 which is positioned at a level above the measuring level of the sensing device 5 defined by the surface the flat rails 10 which support the saw blade. The difference in level is about 10 to 30 cm.

The saw blade while travelling from the roll 12 to the support rails 10 takes a natural curve which results in release of the tension and, thus, in a curvature across the blade 1.

Figure 3:
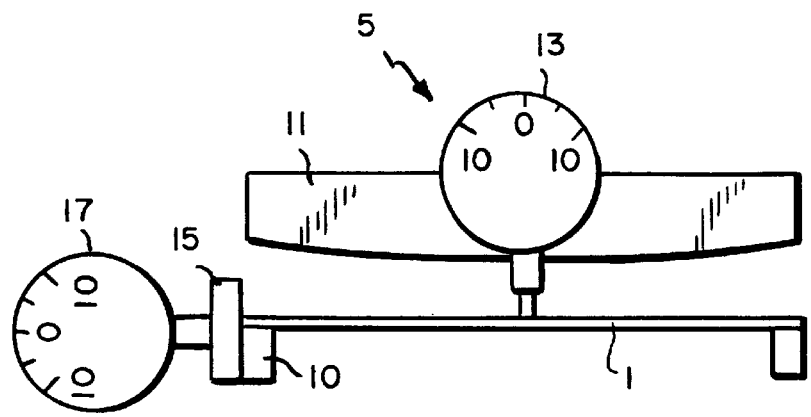

Accordingly, at the location of the sensing device 5 above the rails 10, the saw blade 1 is still curved with a concave surface towards the sensing device 5. This is best seen in FIG. 3. If the saw blade has the correct tension the curvature across the blade is ideal. Deviations from this ideal or desired curvature indicate the need to correct the blade tension. If the curve has portions which are too flat, i.e. it has upwardly directed or positive deviations from the ideal curvature the tension is too small and more tension has to be rolled into the blade. It may also happen that the curve is partially too deep and shows downwardly directed or negative deviations from the ideal curvature which means that the tension is too high and some tension has to be removed. How this is effected is explained hereinafter.

The sensing device generates an electrical signal whenever a difference from the desired tension is detected and transmits the signal to a control unit 6.

At a certain distance behind (with regard to the movement of the saw blade) the sensing device 5 a roller device 7 is positioned.

The roller device contains a pair of rollers 14 for rolling tension into the saw blade 1. The details of this process are explained in more detail in the following.

Figure 2:
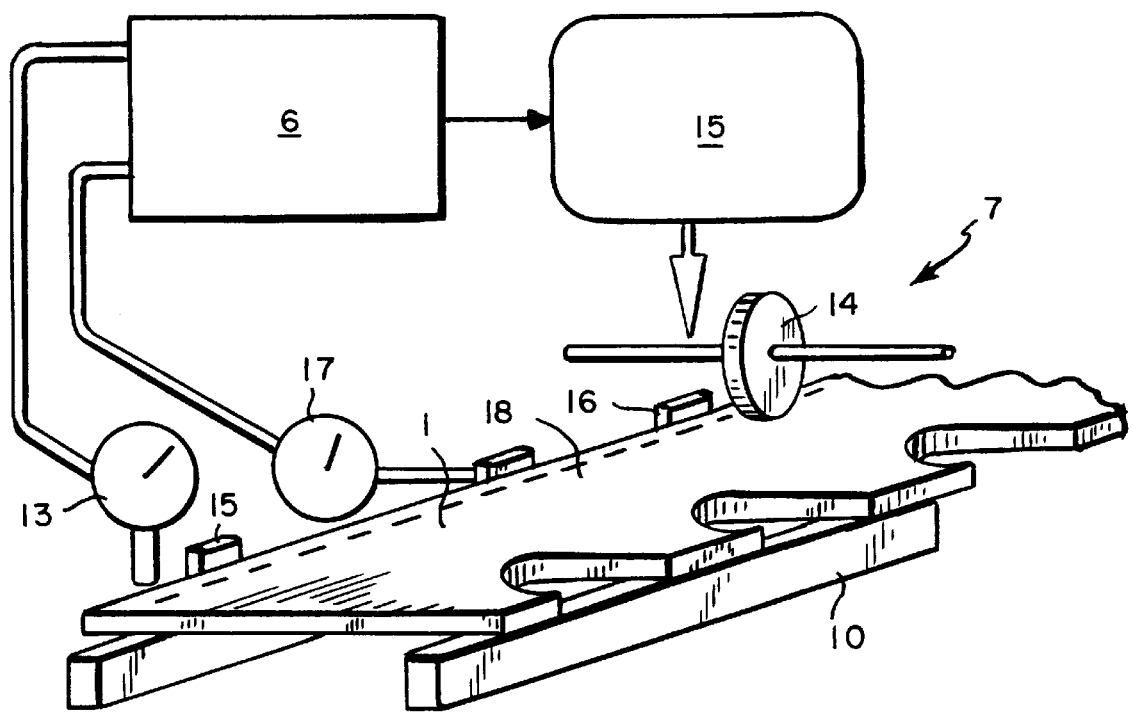

Located above the saw blade 1 as a part of the sensing device 11 is a feeler gauge 13, the tracing pin of which scans the surface of the band saw blade 1. The feeler gauge 13 is disposed in conventional manner on a template 11 on which it can be displaced transverse to the direction of travel of the band saw blade. The template 11 has the desired ideal curvature which is to be obtained with appropriate tension in the blade 1. Alternatively, the template could be replaced by a straight rail or bar and the curvature could be programmed in the control unit 6. The feeler gauge 13 generates the measuring signal which is conveyed to the control unit 6. In FIG. 2 the template 11 is not shown for clarity reasons.

As already mentioned, the roller device 7 is disposed a certain distance behind the feeler gauge 13. The roller device comprises tensioning rollers 14. The rollers 14 are quite similar to those of the tensioning station disclosed in U.S. Pat. No. 4,852,430. The only difference lies in the fact that, instead of one being provided with a convex and the other with a concave running surface, both opposing rollers are provided with the same convex running surfaces. It is possible, as shown in FIG. 3A of U.S. Pat. No. 4,852,430 to provide two pair of rollers.

Based on the signal and taking into account the distance of the rollers 14 from the feeler gauge 13, the control unit 6 generates a command to a hydraulic device which exerts a pressing force onto the rollers. The more precise mechanical embodiment of power transmission is also disclosed in U.S. Pat. No. 4,852,430 and will not be described in further detail here.

The sensing device contains a further feeler gauge 17 disposed to the side of the saw blade 1 for scanning the back thereof.

To this end two guides, 15, 16 are extending upwards from the rail at the side where the back of the saw blade is passing. The back of the saw blade is resting against the guides while moving. A third guide is situated between the two other guides and constitutes the measuring sensor of a gauge 17 which touches the back of the saw blade back. When the back is straight, the sensor guide is in line with the two others. If it deviates from this plane in either direction, the saw blade is not straight. The feeler gauge 17 generates a signal if the back of the saw blade deviates from straightness and also delivers this signal to the control unit 6.

A band saw blade is preferably processed as follows: At first the tension of the band saw blade is tested and the requisite tension is rolled in. For this the purpose the feeler gauge 13 is set to zero at both tire lines 18 prior to the start of the processing. Then the rolling is started in the centre or slightly displaced towards the teeth. After the first track in the centre of the band saw blade, the feeler gauge and the roller direction are displaced a short distance, e.g. 1 cm, closer to the back, where the next passage occurs. The next following track lies on the other side of the central track towards the teeth. In this way, displacement always occurs alternately towards the back and towards the teeth, until all tracks provided have been rolled. It has proved desirable to roll approximately eight tracks in this manner in order to achieve the requisite tension in the band saw blade. Depending on requirements, it is also possible to provide fewer or more tracks and also several passages per track. For instance it is sometimes advisable to start again from the centre and roll tracks half way between the tracks rolled in the first sequence.

The rolling is effected only where the measured tension deviates in the upward or positive direction from the desired value. Thus, the rollers may press onto the saw blade during parts of a track only.

If the tension is too high, i.e. the gauge shows a negative deviation, the tension is removed by rolling close to the sides of the saw blade. The choice whether it has to be rolled close to the back or close to the teeth depends on whether the back is too long or too short as described in the following.

After the band saw blade has been tensioned, the straightness of the saw blade is tested and, if necessary, corrected. The back of the straightened blade is then tested again. If the back is too short, then a further run must be made. This is effected by rolling processes on both outermost continuous tracks, i.e. directly on the back and directly behind the teeth. A depression in the back recorded by the feeler gauge 17 away from the feeler gauge 17 indicates that the back is too short and achieves a rolling procedure in a zone between the back and a so-called tire line about 1 inch from the back in the sense of an elongation of this track. Conversely, the recording of a depressing in the direction of the feeler gauge 17 leads to a rolling procedure on the track near to the teeth between the gullet and a tire line about 1 inch from the gullet. Of course, it is also clear for the straightening that the rollers press onto the saw blade only during those parts of a track where a deviation from the straightness is detected.

Preferably three tracks are rolled in the zones between the tire lines and the back or the gullet: The outermost with medium pressure, the next with low pressure and the one closest to the tire line with high pressure.

When a straightening is necessary and has been effected the tension may have been changed. Thus after the straightening another tensioning run may be necessary.

What is claimed is:

1. A band saw blade tensioning machine with a measuring station for measuring the tension in a band saw blade, said band saw blade tensioning machine comprising:

a flat support for the band saw blade, a tensioning station for rolling tension into the band saw blade, means for guiding the saw blade over an elevated point that is higher than the flat support, said guiding means being located before said measuring station to the effect that the saw blade travels in a free curve from the said elevated point to the flat support, and thereby allowing the release of the tension of the saw blade into a curved cross-section thereof, a curved template in the measuring station across the saw blade along which template a measuring gauge is moved for touching the saw blade surface with a tracing pin, the curvature of the template being a desired curvature of the tension-released saw blade, said measuring station generating a measuring signal correlating to the tension in the bandsaw blade, rollers disposed opposite each other above and below the band saw blade with curved surfaces, means for simultaneously pressing the rollers against the lower and upper side of the band saw blade, and a control unit for processing the measuring signal and generating a control signal to the means for pressing against the rollers.

2. A band saw blade tensioning machine according to claim 1, further comprising an additional feeler gauge for scanning the back of the band saw blade and generating a second measuring signal if the back deviates from straightness.

* * * * *